United States Patent
Woods

(10) Patent No.: US 8,214,210 B1
(45) Date of Patent: Jul. 3, 2012

(54) LATTICE-BASED QUERYING

(75) Inventor: William A. Woods, Winchester, MA (US)

(73) Assignee: Oracle America, Inc., Redwood Shores, CA (US)

(*) Notice: Subject to any disclaimer, the term of this patent is extended or adjusted under 35 U.S.C. 154(b) by 1292 days.

(21) Appl. No.: 11/523,911

(22) Filed: Sep. 19, 2006

(51) Int. Cl.
*G10L 15/00* (2006.01)

(52) U.S. Cl. ............... 704/236; 704/7; 704/8; 704/9; 704/10

(58) Field of Classification Search ........... 704/7–10, 704/236
See application file for complete search history.

(56) References Cited

U.S. PATENT DOCUMENTS

| | | | |
|---|---|---|---|
| 6,073,095 A * | 6/2000 | Dharanipragada et al. ... | 704/242 |
| 6,282,538 B1 * | 8/2001 | Woods ........................... | 1/1 |
| 6,397,181 B1 * | 5/2002 | Li et al. ..................... | 704/256.4 |
| 7,366,668 B1 * | 4/2008 | Franz et al. ................ | 704/252 |
| 2002/0026309 A1 * | 2/2002 | Rajan ........................ | 704/200.1 |
| 2002/0116174 A1 * | 8/2002 | Lee et al. ................... | 704/9 |
| 2003/0004914 A1 * | 1/2003 | McGreevy .................. | 707/1 |
| 2005/0149516 A1 * | 7/2005 | Wolf et al. ................. | 707/3 |

\* cited by examiner

*Primary Examiner* — Leonard Saint Cyr
(74) *Attorney, Agent, or Firm* — Park, Vaughan, Fleming & Dowler LLP; Steven E. Stupp

(57) ABSTRACT

A system for processing a query operates by receiving a first query segment that includes audio speech. Next, the system generates a representation for this first query segment, where the representation includes at least two paths associated with alternative phrase sequences for an ambiguity in the audio speech. The system then compares the paths in the representation to a group of documents and determines matching scores for the group of documents based on the comparisons. Finally, the system presents a ranking of the group of documents, where the ranking is based on the matching scores for the group of documents.

22 Claims, 8 Drawing Sheets

FIG. 7

REPRESENTATION 710-1: [ EDGES 712-1 | WEIGHTS 714-1 | SOUND QUALITY 716-1 | ... ]

REPRESENTATION 710-2

MATCHING SCORE 810-1: [ DOCUMENT 812-1 | PASSAGE(S) 814-1 | OCCURRENCES 816-1 | PENALTIES 818-1 | BEST MATCH(ES) 820-1 | ... ]

MATCHING SCORE 810-2

...

LATTICE-BASED QUERYING

CROSS REFERENCE TO RELATED APPLICATIONS

This application is related to pending U.S. patent application Ser. No. 11/097,015, filed on Mar. 31, 2005, entitled "Searching for Words or Phrases in a Representation of Audio Speech," by inventors Paul A. Martin, William D. Walker, William A. Woods, the contents of which is hereby incorporated by reference.

BACKGROUND

1. Field of the Invention

The present invention relates to techniques for retrieving information. More specifically, the present invention relates to systems and methods for performing searches for information based on spoken queries.

2. Related Art

Speech is attractive mode of input for a variety of applications. Unfortunately, user interfaces based on speech are often ineffective or unreliable due to the limitations of existing speech-recognition techniques. This is especially true in situations where the vocabulary and subject matter of interest is open-ended, such as when individuals provide arbitrary requests or queries when retrieving information or performing search tasks A speech-recognition engine typically transforms a spoken utterance into a recognized sequence of words by matching the acoustic data and candidate word sequences, as well as the probability of occurrence of the candidate word sequences in a language model. These language models typically include statistics on the relative frequencies of words and word sequences in a subject or a domain.

Unfortunately, such language models may not be able to accommodate open-ended querying. In particular, an especially difficult problem is the so-called "out-of-vocabulary problem" in which the spoken utterance contains words that are not known to the speech-recognition engine (for example, if the words are outside of the training set or formal grammar on which the language model is based). In such cases, it is difficult if not impossible for the speech-recognition engine to recognize the intended words.

Furthermore, existing speech-recognition engines typically select a single word sequence, even if there are other alternative hypotheses that are almost as good of a match as the selected sequence. As a consequence, such approaches may not offer sufficient flexibility or potential for remedial action when errors occur. Collectively, these difficulties complicate the challenges associated with retrieving information and make it less likely that a search will return meaningful results in response to such speech queries.

Hence what is needed is a method and an apparatus that facilitates searching for information based on spoken queries without the above-described problems.

SUMMARY

One embodiment of the present invention provides a computer system for processing a query. During operation, the system receives a first query segment that includes audio speech. Next, the system generates a representation for this first query segment, where the representation includes at least two paths associated with alternative phrase sequences for an ambiguity in the audio speech.

Next, the system compares the paths in the representation to a group of documents and determines matching scores for the group of documents based on the comparisons. Finally, the system generates a ranking based on the matching scores and presents the ranking to a user.

In some embodiments, the first query segment includes text.

In some embodiments, the ambiguity is associated with acoustic and/or phonetic properties of audio speech. Furthermore, an additional ambiguity may be associated with paraphrases, spelling, or typographical errors in the first query segment.

Note that the alternative phrase sequences may have corresponding weights that indicate a confidence that a respective phrase sequence matches a portion of the first query segment. In some embodiments, the weights depend on a pattern of phrases in the first query segment, on a sound quality of the first query segment, and/or to account for individual speech variations. And in some embodiments, the weights are normalized.

In some embodiments, the system further receives a second query segment and dynamically adjusts the weights in the representation based on at least a portion of the second query segment.

In some embodiments the representation is structured as a trellis. For example, the representation may correspond to an intermediate state of a Viterbi decoder.

In some embodiments, the group of documents includes audio speech and/or text.

In some embodiments, the system further presents snippets and their corresponding contexts for the group of documents.

In some embodiments, a matching score for a given document is based on how many times a given path in the representation occurs in at least a portion of the given document and/or on a pre-determined number of best matches between the paths in the representation and the given document. Furthermore, the matching score for the given document may include different weights for different occurrences of the paths in the representation in at least a portion of the given document. Note that in some embodiments the matching score for the given document includes a penalty for skipped words in the given path, a penalty for changes in a word order in the given path, and/or a penalty for words that have a narrower semantical meaning than those in the given path.

Another embodiment provides a method including at least some of the above-described operations.

Another embodiment provides a computer program product for use in conjunction with the computer system.

BRIEF DESCRIPTION OF THE FIGURES

FIG. 7 is a block diagram illustrating a data structure in accordance with an embodiment of the present invention.

FIG. 8 is a block diagram illustrating a data structure in accordance with an embodiment of the present invention.

Figure 1:
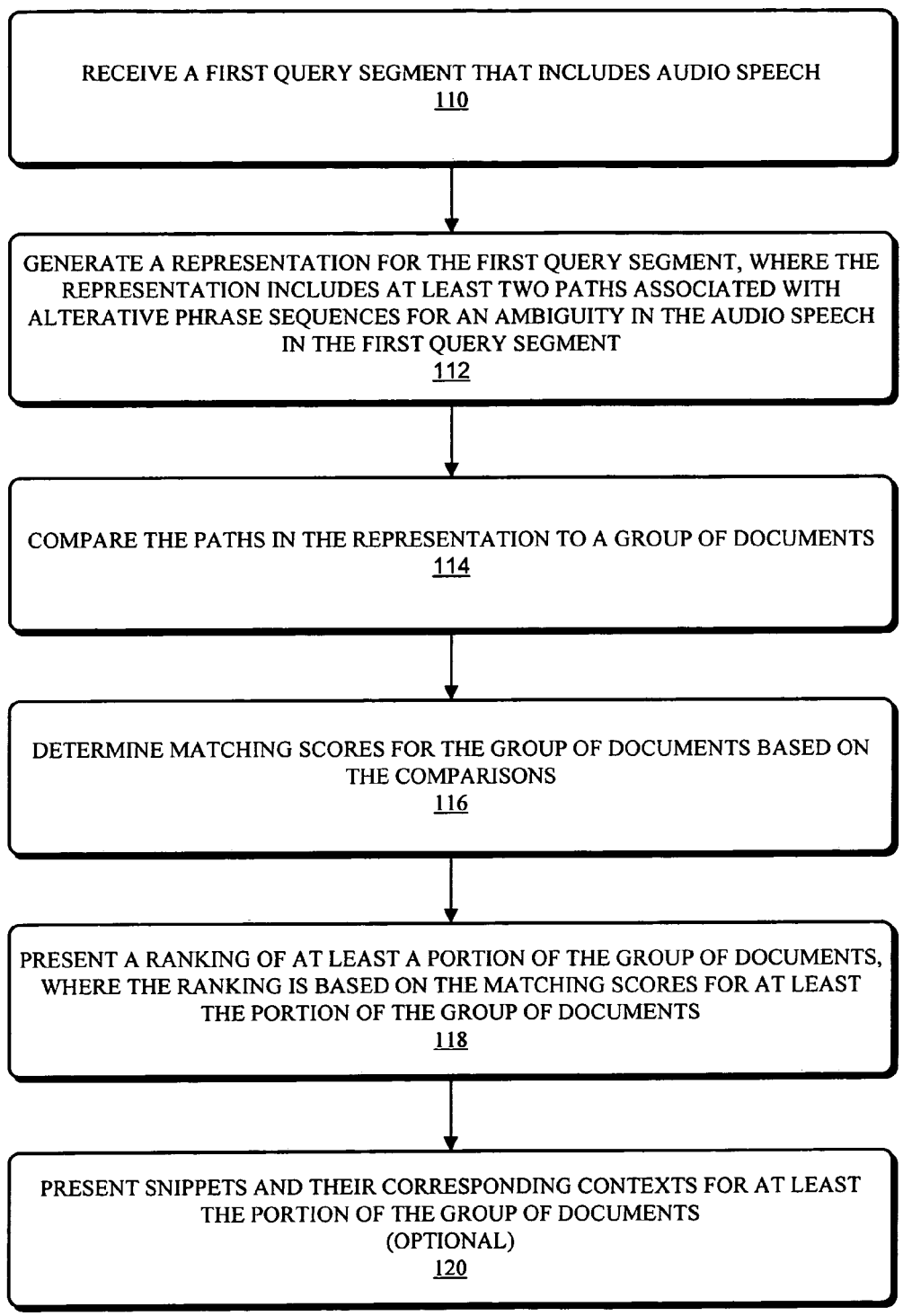
FIG. 1 is a flow chart illustrating processing of a query in accordance with an embodiment of the present invention.

Table I illustrates edge information in a query lattice in accordance with an embodiment of the present invention.

Table II illustrates a document index in accordance with an embodiment of the present invention.

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a method, and a computer program product (i.e., software) for use with the computer system are described. These devices and processes may be used to process one or more queries that include of one or more words, terms, keywords and/or phrases (henceforth referred to as terms) that are provided by a user. These queries may include a lattice structure that is derived from a spoken query utterance and may preserve multiple alternative (i.e., alternative) term-sequence hypotheses from the spoken query utterance. This approach may allow searches in which comparisons are performed between all possible sequences in the lattice structure and information in a group of documents. In this way, matches may be identified if there is a correct interpretation of the spoken query in the lattice, even when a single best-guess interpretation of the spoken query would not have matched or would have matched incorrect material. Furthermore, in some embodiments the results may include portions of one or more documents (which are referred to as snippets or passages) and their corresponding contexts in the group of documents, which are based on the lattice structure(s).

This technique for processing speech queries may be used to deal with the problem of out-of-vocabulary terms (i.e., terms in a language that aren't in a dictionary or database) and, in general, for the processing of queries in open-ended domains. In particular, if a spoken query contains an out-of-vocabulary term, the resulting lattice structure is likely to include one or more partially matching or similar terms. Note that this approach combines flexibility in handling uncertainty in the spoken query (due to the acoustic and/or phonetic properties of audio speech, as well as ambiguity associated with paraphrases and grammatical errors) and independence from the structural limitations associated with a given language model. As a consequence, the search results are more likely to return relevant or desired information, especially if the material being searched includes spoken content that has been indexed using the same or a similar speech-recognition engine.

The lattice-based querying approach described below may be used in conjunction with a wide variety of devices and associated user interfaces, including a client computer (such as a personal computer), a laptop computer, a cellular phone, a personal digital assistant (PDA), a consumer product (such as a remote control), and/or another device capable of presenting information and/or manipulating data. In addition, this querying approach may be used in computer systems that include communication over a network (such as the Internet, the World Wide Web or WWW, an Intranet, a local area network or LAN, a wide area network or WAN, a metropolitan area network or MAN, and/or combination of networks or other technology enabling communication between devices). Such computer systems may include a search engine that is used to locate content in documents in a large database of documents (for example, documents on the Internet and/or the documents stored on the computers of an Intranet).

We now describe embodiments of a computer system, a method, and software for processing queries. FIG. 1 provides a flow chart illustrating a process 100 for processing a query in accordance with an embodiment of the present invention. In this process, a system receives a first query segment that includes audio speech (110). Note that the first query segment may also include content in other formats, such as text, graphical, photographic and/or video. Next, the system generates a representation for the first query segment (112) and/or other content (such as a graph). This representation includes at least two paths associated with alternative (i.e., alternative) phase sequences for an ambiguity in the audio speech in the first query segment. In addition, in some embodiments the query includes synonyms and/or other terms that utilize the semantic relationships between general and specific terms (for example, by adding paths with alternative terms sequences).

The system then compares the paths in the representation to a group of documents (114) and determines matching scores for the group of documents based on the comparisons (116). Furthermore, the system presents a ranking of at least a portion of the group of documents, where the ranking is based on the matching score for at least the portion of the group of documents (118). And in some embodiments, the system optionally presents snippets (such as passages) and their corresponding contexts for at least the portion of the group of documents (120). For example, snippets in a given document may be highlighted. Note that in some embodiments there may be additional or fewer operations, the order of the operations may be changed, and two or more operations may be combined into a single operation.

Figure 2A:
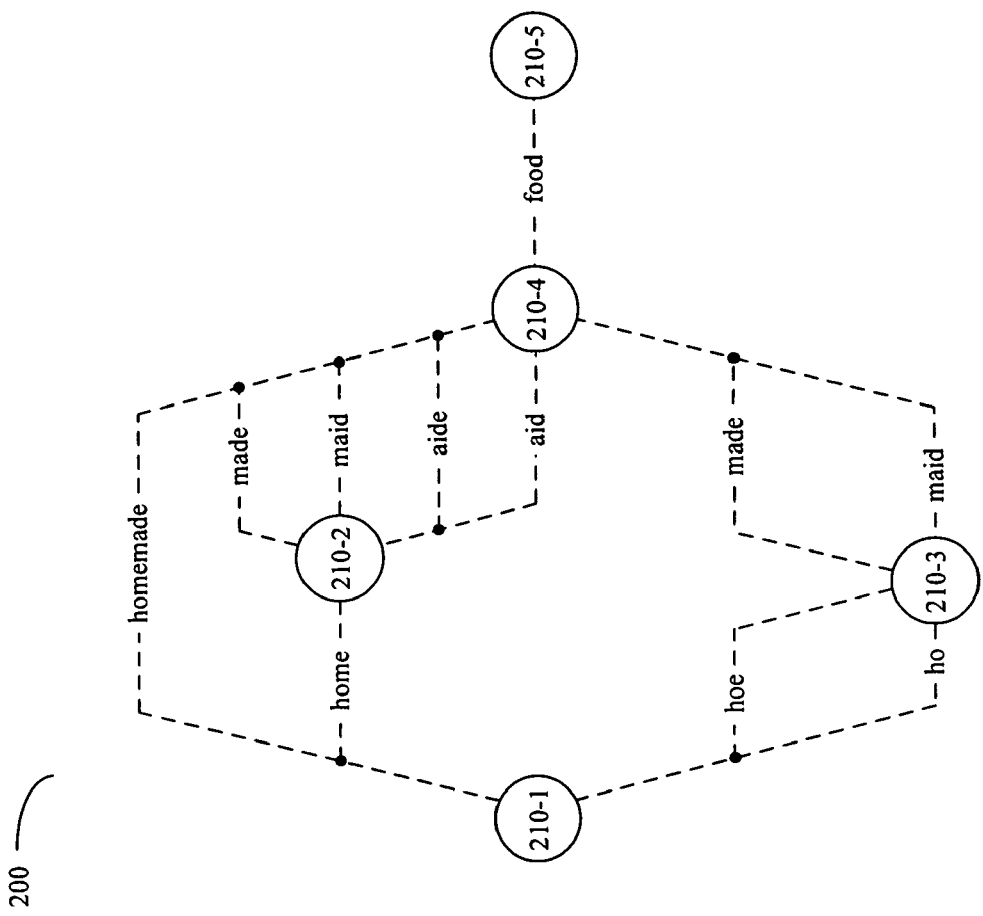
FIG. 2A is a block diagram illustrating a query lattice in accordance with an embodiment of the present invention.

FIG. 2A provides a block diagram illustrating a query lattice (i.e., a representation) 200 in accordance with an embodiment of the present invention. As described below, this query lattice is not simply a list of terms and/or a Boolean combination of terms provided by the user, synonyms, and/or paraphrases. Instead, the query lattice 200 includes the term order as well as one or more ambiguities (corresponding to branch points at nodes 210 in the query lattice 200) associated with alternative segmentations of a speech signal (such as the first query segment) that includes spoken words or phrases. For example, the ambiguities may be associated with acoustic and/or phonetic properties of audio speech, since there are a wide range of pronunciations and dialects, and many words sound similar. Additional ambiguities may be associated with paraphrases and/or grammatical errors, such as spelling or typographical errors in the first query segment (in embodiments where the first query segment also includes content such as text).

These various paths may be compared to at least a portion of a group of documents in order to increase a probability for returning desired or meaningful results (i.e., results that the user is interested in). In particular, corresponding matching scores between the paths in the queries lattice 200 and the documents may be determined and results may be provided to the user based on these matching scores. Note that the group of documents may include content in a variety of formats, such as audio speech, text, graphs, photographs, and/or video.

Rather than collapsing the query lattice 200 into a single best or most-likely output (or more generally, a set of n-best outputs) prior to comparing the queries to at least a portion of the group of documents, in this approach the collapsing occurs after the results and/or related snippets are provided to the user. In fact, in some embodiments such a narrowing (or windowing) is implicit in the selection by the user of desired or interesting content from the provided results. However, in other embodiments queries that include query lattices, such as the query lattice 200, may be presented to a user who selects the 'correct' path prior to comparing this path to at least the portion of the group of documents.

In an exemplary embodiment, the query lattice 200 may be structured as a trellis. For example, the representation may correspond to an intermediate state of a Viterbi decoder.

As noted previously, the query lattice 200 includes a collection of nodes 210. For example, in query lattice 200 node 210-1 is an initial node, node 210-5 is a final node, and nodes 210-2, 210-3, and 210-4 are intermediate nodes. Each of the nodes 210 has associated edges that each include a term choice or term category, and an associated weight (not shown). Furthermore, a given path through the query lattice 200 includes two or more nodes 210 and the associated terms. Note that in general paths through the query lattice 200 include a serial combination of nodes 210 and edges. Also note that the cumulative weights in a given path correspond to a confidence or likelihood that a group of terms linked by the nodes 210 in the given path match a portion of the spoken query, and thus, the importance of this group of terms to the query. Table I presents an illustration of the edges in the query lattice 200, including beginning and end nodes, and the corresponding terms and weights.

TABLE I

Edge information for the query lattice 200.

| Beginning node | End node | Term(s) | Weight |
|---|---|---|---|
| 210-1 | 210-4 | homemade | 1.0 |
| 210-1 | 210-2 | home | 1.0 |
| 210-2 | 210-4 | made | 0.8 |
| 210-2 | 210-4 | maid | 0.8 |
| 210-2 | 210-4 | aide | 1.0 |
| 210-2 | 210-4 | aid | 1.0 |
| 210-1 | 210-3 | hoe | 0.7 |
| 210-1 | 210-3 | ho | 0.7 |
| 210-3 | 210-4 | made | 0.9 |
| 210-3 | 210-4 | maid | 0.9 |
| 210-4 | 210-5 | food | 1.0 |

Note that in some embodiments the weights associated with the edges depend on a pattern of phrases in the first query segment and/or on a sound quality of the first query segment. Furthermore, in some embodiments the weights are adjusted to account for individual speech variations (for example, the weights may be selected such that the query that includes the query lattice is approximately dialect independent). And in some embodiments, the weights are normalized such that their sum is 1.

We now describe embodiments of searches performed using queries that include one or more query lattices. In these searches, queries may be compared to targets in at least a portion of the group of documents. Note that the targets may include text, speech, graphics, photographs, and/or video. In some embodiments, the speech content in the targets may be the best-guess sequence provided by a speech-recognition engine. Alternatively, the speech content may include lattice indexing (i.e., a lattice structure such as that illustrated in lattice 230 in FIG. 2B). In these embodiments, the speech content in at least the portion of the group of documents may include corresponding edge weights.

During a search, the system identifies at least portions of the indexed material (for example, passages in at least a subset of the group of documents) that correspond to one or more paths through a query lattice in a query. Using this technique, the system may compute the union of all the passages that are found by treating each path through the query lattice in the query as a separate sub-query. Furthermore, the system may accomplish this by determining a list of all of the occurrences of terms in the query in the index material. In some embodiments, this list may be grouped and ordered by document, including the position(s) within a given document where one or more of the terms are located.

Figure 3:
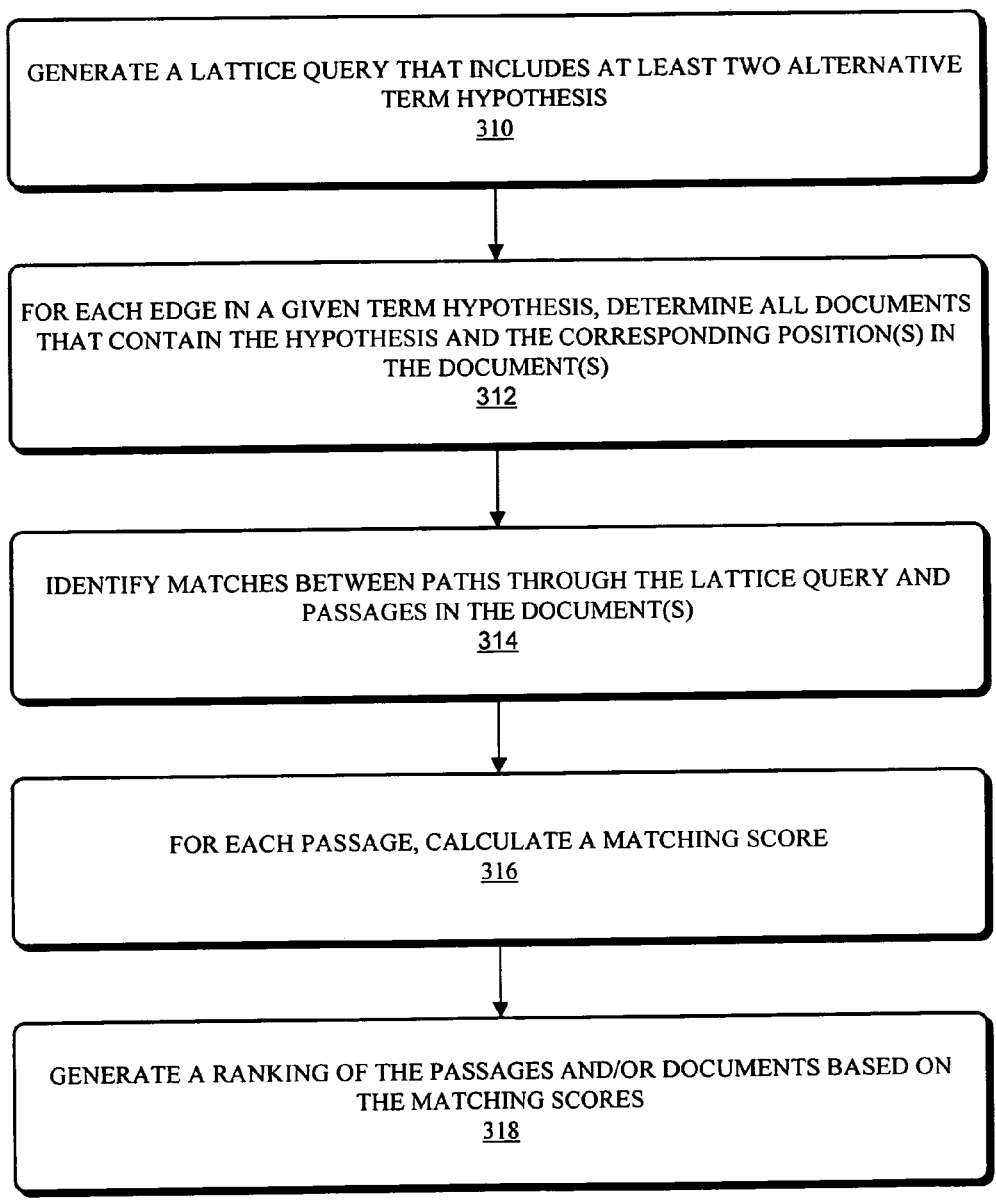
FIG. 3 is a flow chart illustrating processing of a query in accordance with an embodiment of the present invention.

FIG. 3 provides a flow chart illustrating a process 300 for processing a query in accordance with an embodiment of the present invention. The system generates a lattice query (310) for a spoken input by capturing the alternative term hypotheses provided by a speech-recognition engine as a set of alternative term sequences. Note that each edge in these alternative term sequences includes a term hypothesis and an associated weight or confidence value. Furthermore, for each edge in a given term hypothesis, the system determines all documents that contain this term hypothesis and the corresponding positions in the document(s) (312).

Then, the system identifies matches between two or more paths through the lattice query and passages in the document(s) (314) and calculates a matching score for each passage (316). After repeating the preceding operations for all edges and term hypotheses, the system generates a ranking of the passages and/or documents based on the matching scores (318). Note that in some embodiments there may be additional or fewer operations, the order of the operations may be changed, and two or more operations may be combined into a single operation.

In some embodiments, a passage in a given document is considered a match with a sequence of terms in a sub-query if it matches a sufficient number of terms in the sequence and if these term matches occur within a pre-determined distance of one another. A contribution to the matching score between the given document and a given path in the query lattice may be based on the cumulative product of the weights in the edges in this path and a quality of the matches with the passages in the given document. Note that the latter may include a penalty for terms in the given path that are skipped in the passages, a penalty for changes in a term order in the passages, and/or a penalty for terms in the passages that have a narrower semantical meaning than those in the given path (for example, a poodle is a type of dog, but not all dogs are poodles).

Furthermore, the matching score for the given document may be based on how many times a given path in the representation (i.e., the query lattice) occurs in at least a portion of the given document and/or on a pre-determined number of best matches (for example, 1, 2, or 3) between the paths in the representation and the passages in the given document (which is sometimes referred to as passage-based retrieval). Note that in some embodiments the matching score for the given document is a weighted summation of such matches, and the summation may include different weights for different occurrences of the paths in the representation in at least the portion(s) of the given document. Also note that in some embodiments the weights in the representation are dynamically adjusted. For example, if the system receives a second query segment, at least some of the weights in one or more paths through the query lattice may be adjusted based on the second query segment. In embodiments where the speech-recognition engine includes a Viterbi detector, an initial set of weights may correspond to an intermediate state of the detector that is based on a portion of a query. As the detector processes an additional portion of the query, the initial set of weights may be adjusted, for example, if one or more alternate paths in a lattice are collapsed or modified based on the additional portion of the query.

As an illustrative example, consider four documents, "She was as plain as homemade sand" (document d1). "I made some pastry at home" (document d2), "Social Services will pay for a home aide" (document d3), and "Homemade food is best" (document d4). As illustrated in Table H, an index of these documents may include terms, one or more document identifiers, and one or more positions of the terms in the document(s) (for example, based on the word number from left to right).

TABLE II

A document index.

| Term | Document Identifier(s) | Position(s) in Document |
| --- | --- | --- |
| a | d3 | 6 |
| aide | d3 | 8 |
| as | d1 | 3, 5 |
| at | d2 | 5 |
| best | d4 | 4 |
| food | d4 | 2 |
| for | d3 | 5 |
| home | d2; d3 | 6; 7 |
| homemade | d1; d4 | 6; 1 |
| I | d2 | 1 |
| is | d4 | 3 |
| made | d2 | 2 |
| pastry | d2 | 4 |
| pay | d3 | 4 |
| plain | d1 | 4 |
| sand | d1 | 7 |
| services | d3 | 2 |
| she | d1 | 1 |
| social | d3 | 1 |
| some | d2 | 3 |
| was | d1 | 2 |
| will | d3 | 3 |

For a search based on the query lattice 200 (FIG. 2A), matching passages in the documents will be determined for each of the edges, i.e., edge 1 ('homemade), edge 2 ('home'), edge 3 ('made'), edge 4 ('maid'), edge 5 ('aide'), edge 6 ('aid'), edge 7 ('hoe'), edge 8 ('ho'), edge 9 ('made'), edge 10 ('maid'), and edge 11 ('food'). In particular, edge 1 has matches in documents d1 (position 6) and d4 (position 1), edge 2 has matches in documents d2 (position 6) and d3 (position 7), edge 3 has a match in document d2 (position 2), edge 5 has a match in document d3 (position 8), edge 9 has a match in document d2 (position 2), and edge 11 has a match in document d4 (position 2). Note that if a lexicography used by the system knows that pastry is a kind of food, edge 11 will have another match in document d2 (position 4).

To find the best passages, the system determines corresponding matching scores by summing penalties for intervening terms in the passages, penalties for terms out of order in the passages, penalties for lack of confidence in terms in the paths, penalties for lack of confidence in terms in the index, and penalties for missing terms in the passages. For example, a missing term may have a penalty of 10, an extra intervening term may have a penalty of 0.1, an out-of-order term may have a penalty of 0.12, and a more-specific term may have a penalty of 0.01. In addition, the penalty for lack of confidence in a term in one of the paths may be determined by subtracting from 1 the product of the confidence in this term (i.e., its weight) and the corresponding weight for the matching passage term.

Referring to FIG. 2A, the path through node 210-1, edge 1, node 210-4, edge 11, and node 210-5 has matching passage for the complete path in document d4. In addition, there is no penalty since both terms have a full confidence of 1.0 (as illustrated in Table I) and they are next to one another and are in the correct order. Thus, this passage has a matching score of 0.

There is a missing-term passage for 'homemade' in document d1, with a missing term penalty (and a matching score) of 10 due to the 'food' term. In addition, there is a missing-term passage for 'food' in document d2, with a missing-term penalty of 10 for the 'homemade' term and a penalty of 0.01 for matching the more-specific term pastry rather than the query term 'food'. The resulting matching score is 10.01.

However, the second-best matching passage is in document d2 and includes edges e2 ('home'), e3 ('made'), and e11 ('food'). The corresponding matching score of 0.89 includes a penalty of 0 for matching the term 'home' at position 6 in the document with a full confidence of 1.0, a penalty of 0.2 for the lack of confidence in edge 3 (as illustrated in Table I), an out-of-order penalty of 0.48 (4 times 0.12) for 'made' at position 2, a more-specific term penalty of 0.01 for 'pastry' matching 'food', and an intervening-term penalty of 0.2 for 'pastry' at position 4 in the document.

Finally, there are missing-term passages for the term 'home' in documents d3 and d4. Each of these passages have a matching score of 20, since the terms 'made' and 'food' are missing in those documents. Note that while this example includes illustrative values of the penalties and a technique for determining the matching scores, other approaches may be used as is known to one of skill in the art.

As noted previously, in some embodiments the documents in the group of documents include lattice indexing for speech content. In these embodiments, the search approach described above may be generalized and applied to the edges in lattices of alternative term sequences in one or more of the documents corresponding to various term hypotheses that were generated by a speech-recognition engine.

Figure 2B:
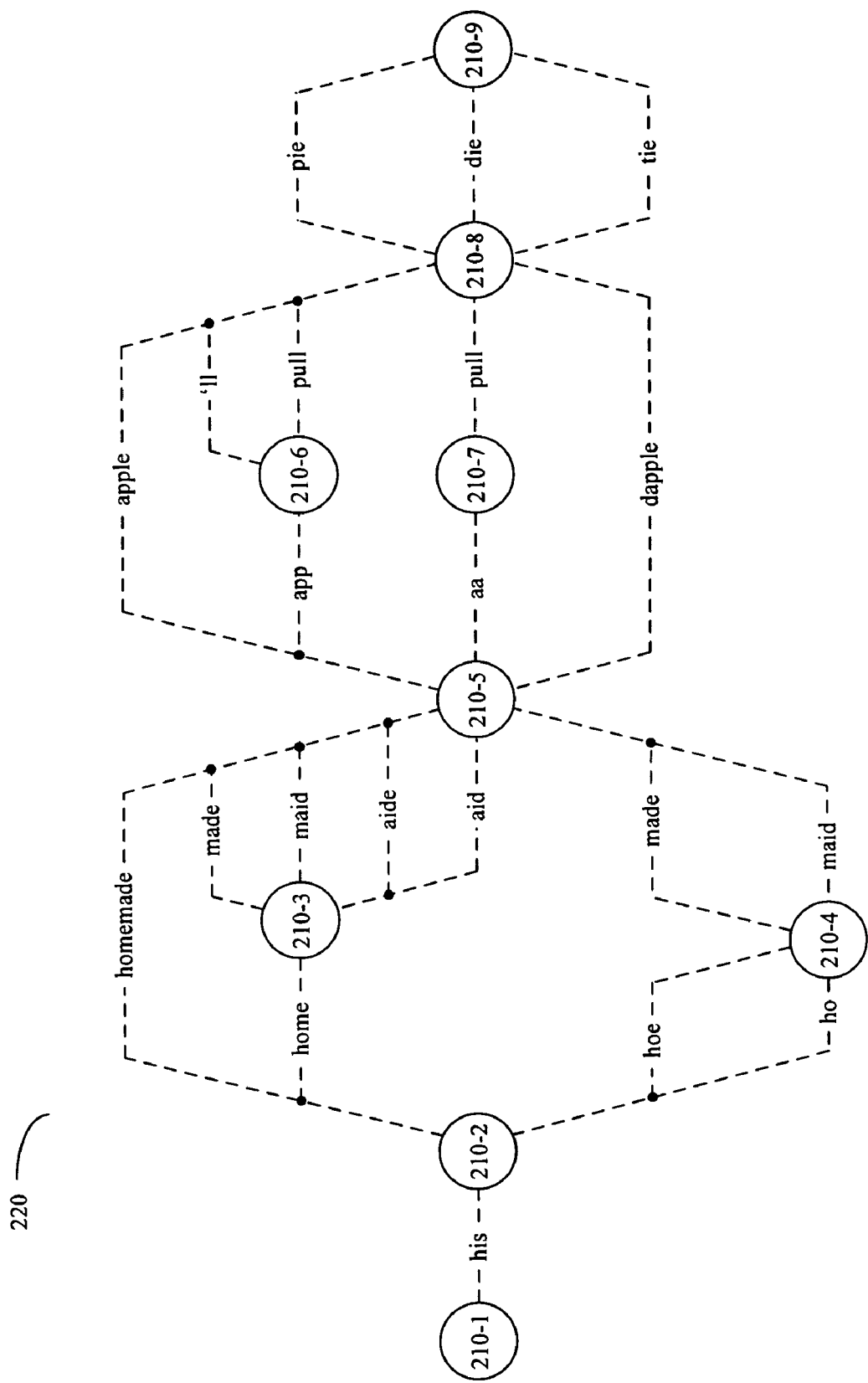
FIG. 2B is a block diagram illustrating a lattice in an index in accordance with an embodiment of the present invention.

For example, FIG. 2B provides a block diagram illustrating the lattice 230 for a portion of a spoken document in an index in accordance with an embodiment of the present invention. Note that while the terms 'pie', 'die' and 'tie' between nodes 210-8 and 210-9 generally sound distinct to the ear, in fact they differ from one another by a single phoneme and the sounds of 'p', 'd', and 't' are sufficiently similar that a speech-recognition engine may consider them all as viable acoustic alternatives at a given point in an utterance. Furthermore, certain pronunciations and/or noise conditions may cause the speech-recognition engine to score 'die' higher than 'pie' in an utterance even though an individual was actually talking about 'pie'. If the taxonomy in the system knows that 'pie' is a type of food, then the lattice-based query described above will find the path 'homemade apple pie' in the portion of the indexed speech between nodes 210-2 and 210-9. It will also find paths for 'homemade dapple pie', 'home aide apple pie', etc., which are equivalent since they cover the same portion of the indexed material between nodes 210-2 and 210-9. However, in some embodiments it may not matter whether or not the system is able to resolve such ambiguities. For example, the system may provide the user with several best-scoring or high-scoring paths to illustrate some of the ambiguity. Furthermore, in some embodiments audio clips that include the corresponding spoken material may be selected by the user and played back.

When querying a lattice-index in one of more documents, the search operations are similar to those described above, except that the matching terms in the index will have associated edges and weights. The weight of an edge in the query lattice may be combined with that of a term hypothesis in the index to obtain a combined weight. For example, the weights may be multiplied or a minimum weight may be used. In addition, the intervening-term penalty may be determined based on the distance between the end position of the previous matching term in the index and the beginning position of the next matching term in the index. Note that the out-of-order penalty may be similarly generalized.

Figure 4:
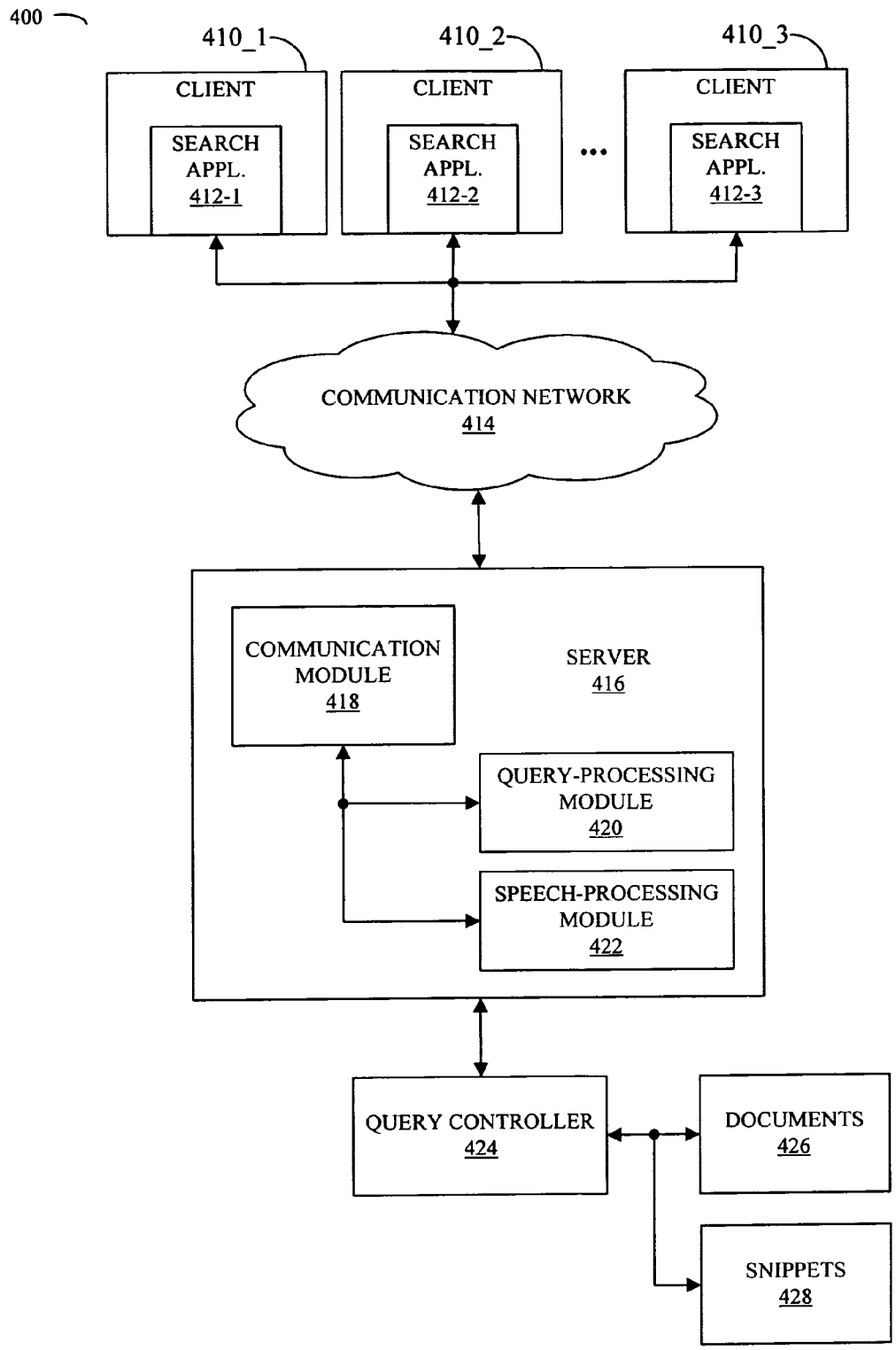
FIG. 4 is a block diagram illustrating a search engine in accordance with an embodiment of the present invention.

We now describe embodiments of systems and devices that may utilize lattice-based querying. FIG. 4 provides a block diagram illustrating a search engine 400 in accordance with an embodiment of the present invention. The search engine 400 receives query segments from one or more clients 410, identifies one or more matching documents or passages in an index of documents 426, and provides the search results to the one or more clients 410. Each of the clients 410 may include a search application 412, which is described further below with reference to FIG. 6.

Note that the search engine 400 may be used to retrieve information on the Internet and/or on an Intranet, i.e., for locating documents stored on servers or other hosts on a communication network 414. The retrieved information may include matching documents, passages in matching documents (such as titles and abstracts), and/or rankings of results.

The search engine 400 may be implemented as a distributed system that includes multiple servers, such as server 416, each of which is configured to process queries. These servers may be distributed over a wide geographic area. Queries submitted by a user at a client, such as client 410-1, are routed to an appropriate server, such as the server 416, based on the user's location, a number of servers that are currently in operation, and/or an overall usage of the search engine 400.

The servers, such the server 416, may be coupled to the communication network 414 via a communication module 418. Note that the communication network 414 may include the Internet, an Intranet, a LAN, and/or a WAN. In embodiments where the server 416 is a Web server, the server 416 receives query requests (such as query segments) and provides search results in the form of web pages that are compatible with a HyperText Transfer Protocol (HTTP), an Extensible Markup Language (XML), and/or a similar protocol.

The server 416 may include a query-processing module 420 for managing the processing of queries by one or more query controllers, such as query controller 424. In addition, the server 416 may include a speech-processing module 422 to generate one or more representations corresponding to query segments that include speech. These representations may be included in the queries that are processed by the query controllers.

The query controllers, such as the query controller 424, may be coupled to the index of documents 426 and/or a database of passages or snippets 428. Furthermore, the query controller 424 is configured to receive requests from the server 416, to identify matches, and to determine matching scores. Using the identified matches and matching scores, the query-processing module 420 may provide results to the user. For example, a ranking (i.e., an ordered list of search results) may be provided to the user. In addition, the query-processing module 420 may instruct the query controller 424 to retrieve the corresponding documents and/or passages from the index of documents 426 and/or the database of snippets 428, which may then be provided to the user. Note that in some embodiments only a subset of the results is presented to the user.

The search engine 400 may include fewer components or additional components, two or more components may be combined into a single component, and/or a position of one or more components may be changed. In addition, functions of the search engine 400 may be implemented in hardware and/or in software. These functions may be distributed over fewer or more servers and devices, which may be located at one or more locations. Furthermore, functions in the search engine 400 may be implemented at a lower level or at a higher level in the system hierarchy.

Figure 5:
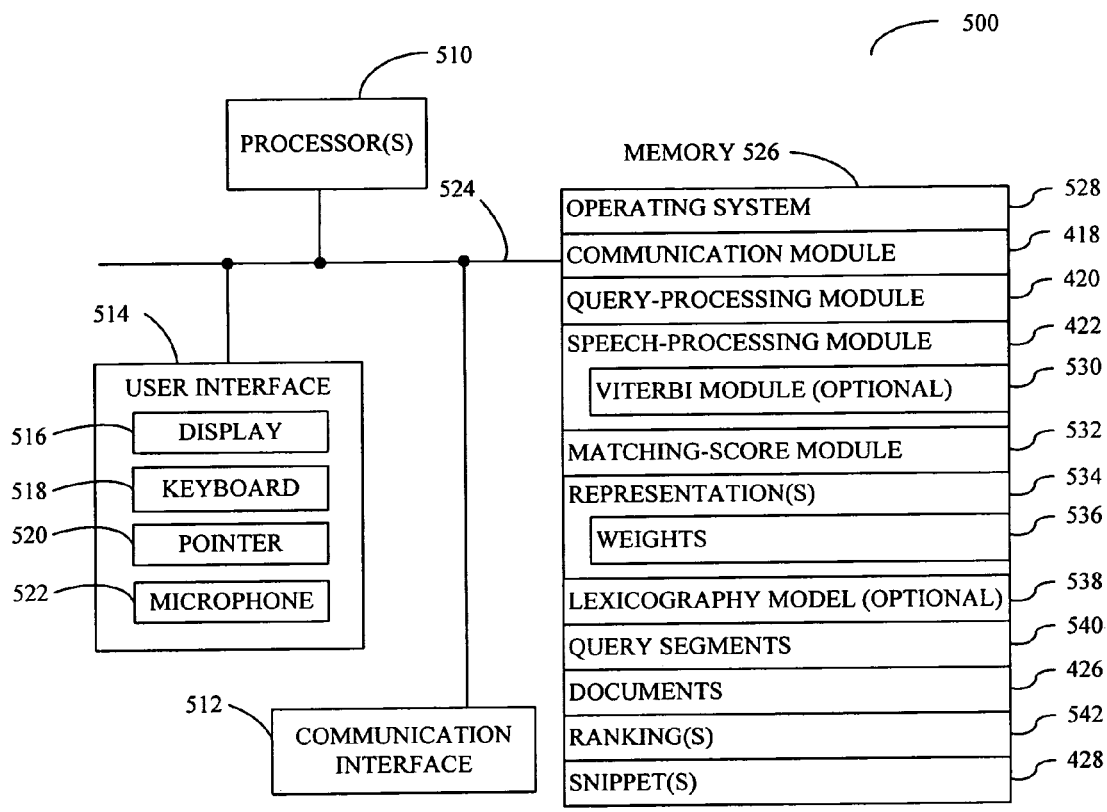
FIG. 5 is a block diagram illustrating a computer system in accordance with an embodiment of the present invention.

FIG. 5 provides a block diagram illustrating a computer system 500 in accordance with an embodiment of the present invention. The computer system 500 may be used in the search engine 400 (FIG. 4) and includes one or more processors 510, a communication interface 512, a user interface 514, and one or more signal lines 524 coupling these components together. Note that the one or more processing units 510 may support parallel processing and/or multi-threaded operation, the communication interface 512 may have a persistent communication connection, and the one or more signal lines 524 may constitute a communication bus. Moreover, the user interface 514 may include a display 516, a keyboard 518, a pointer 520 (such as a mouse), and/or a microphone 522.

Memory 526 in the computer system 500 may include volatile memory and/or non-volatile memory. More specifically, memory 526 may include ROM, RAM, EPROM, EEPROM, FLASH, one or more smart cards, one or more magnetic disc storage devices, and/or one or more optical storage devices. Memory 526 may store an operating system 528 that includes procedures (or a set of instructions) for handling various basic system services for performing hardware dependent tasks. While not explicitly indicated in the computer system 500, in some embodiments the operating system 528 includes a web browser. The memory 526 may also store procedures (or a set of instructions) in a communication module 418. The communication procedures may be used for communicating with one or more computers and/or servers, including computers and/or servers that are remotely located with respect to the computer system 500.

Memory 526 may also include multiple program modules (or a set of instructions), including query-processing module 420 (or a set of instructions) to receive query segments 540 and generate corresponding queries that include representations 534, and speech-processing module 422 (or a set of instructions) to determine the representations 534 and corresponding weights 536 from the query segments 540. Note that the speech-processing module 422 may include an optional Viterbi module 530 (or a set of instructions).

In addition, the memory 526 may include a matching-score module 532 (or a set of instructions) to compare queries that include the representations 534 to the index of documents 426, to generate corresponding matching scores, and to provide documents in the index of documents 426, to provide rankings 542, and/or to provide snippets 428. In some embodiments, the memory 526 may optionally include lexicography module 538 (or a set of instructions) to determine the weights 536 and/or matches between the terms in the index of documents 426 and the representations 534.

Instructions in the various modules in the memory 526 may be implemented in a high-level procedural language, an object-oriented programming language, and/or in an assembly or machine language. The programming language may be compiled or interpreted, i.e, configurable or configured to be executed by the one or more processing units 510.

Although the computer system 500 is illustrated as having a number of discrete items, FIG. 5 is intended to be a functional description of the various features that may be present in the computer system 500 rather than as a structural schematic of the embodiments described herein. In practice, and as recognized by those of ordinary skill in the art, the functions of the computer system 500 may be distributed over a large number of servers or computers, with various groups of the servers or computers performing particular subsets of the functions. In some embodiments, some or all of the functionality of the computer system 500 may be implemented in one or more ASICs and/or one or more digital signal processors DSPs.

The computer system 500 may include fewer components or additional components, two or more components may be combined into a single component, and/or a position of one or more components may be changed. In some embodiments the functionality of the computer system 500 may be implemented more in hardware and less in software, or less in hardware and more in software, as is known in the art.

Figure 6:
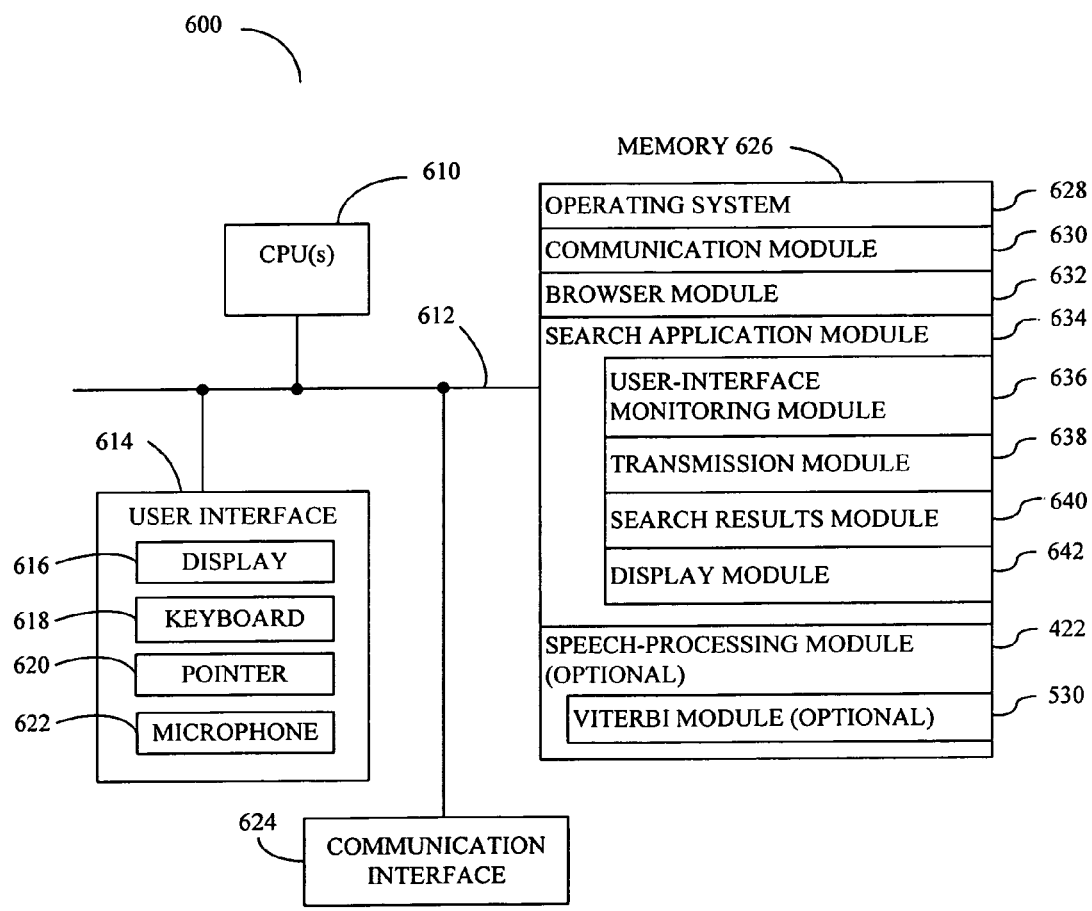
FIG. 6 is a block diagram illustrating a client computer in accordance with an embodiment of the present invention.

FIG. 6 provides a block diagram illustrating a client computer 600, such as one of the client computers 410 (FIG. 4), in accordance with an embodiment of the present invention. The client computer 600 may include one or more data processors or central processing units (CPUs) 610, a communication interface 624 for communicating with other computers, servers and/or clients, a user interface 614, a memory 626, and one or more signal lines 612 for coupling these components to one another. Note that the one or more processing units 610 may support parallel processing and/or multi-threaded operation, the communication interface 624 may have a persistent communication connection, and the one or more signal lines 612 may constitute a communication bus. Moreover, the user interface 614 may include a display 616, a keyboard 618, a pointer 620 (such as a mouse), and/or a microphone 622.

Memory 626 in the client computer 600 may include volatile memory and/or non-volatile memory. More specifically, memory 626 may include ROM, RAM, EPROM, EEPROM, FLASH, one or more smart cards, one or more magnetic disc storage devices, and/or one or more optical storage devices. Memory 626 may store an operating system 628 that includes procedures (or a set of instructions) for handling various basic system services for performing hardware dependent tasks. The memory 626 may also store procedures (or a set of instructions) in a communication module 630. The communication procedures may be used for communicating with one or more computers and/or servers, including computers and/or servers that are remotely located with respect to the client computer 600. In addition, the communication procedures may be used for communicating with a search engine, such as the search engine 400 (FIG. 4).

Memory 626 may also include multiple program modules (or a set of instructions), including a browser module 632 (or a set of instructions) and the search application module 634 (or a set of instructions). The search application module 634 may include a user-interface monitoring module 636 (or a set of instructions) for monitoring user input, a transmission module 638 (or a set of instructions) for sending a query and/or a query segment, a search results module 640 (or a set of instructions) for receiving search results, and a display module 642 (or a set of instructions) for displaying search results.

In addition, in some embodiments the memory 626 optionally includes the speech-processing module 422 (or a set of instructions) and/or the optional Viterbi module 530. Thus, in these embodiments the client system 600 may processes the query segments and determine one or more of the representations 534 that are then transmitted to a search engine, such as the search engine 400 (FIG. 4).

Note that client computer 600 may include fewer components or additional components, two or more components may be combined into a single component, and/or a position of one or more components may be changed. For example, in embodiments where the client computer 600 is coupled to a local server, one or more of the modules and/or applications in the memory 626 may be stored in a server computer at a different location than the user. In addition, the various modules and sub-modules may be rearranged and/or combined. As an illustration, in some embodiments the search application module 634 may be integrated into the browser module 632.

We now discuss data structures that may be used in the search engine 400 (FIG. 4), the computer system 500 (FIG. 5), and/or the client computer 600. FIG. 7 provides a block diagram illustrating a data structure 700 in accordance with an embodiment of the present invention. This data structure may include representations 710 for one or more query segments. A given representation, such as representation 710-1, may include edges 712-1, weights 714-1, and/or sound quality 716-1. In some embodiments, the edges 712-1 and the weights 714-1 are included co-indexed arrays.

FIG. 8 provides a block diagram illustrating a data structure 800 in accordance with an embodiment of the present invention. This data structure may include matching scores 810. A given matching score, such as matching score 810-1, may include document 812-1, one or more passage(s) 814-1, occurrences or positions 816-1 of matches for one or more terms in a representation, penalties 818-1, and/or one or more best matches 820-1 in the document 812-1. Note that that in some embodiments of the data structures 700 and/or 800 there may be fewer or additional components, two or more components may be combined into a single component, and/or a position of one or more components is changed.

While the preceding discussion has focused on lattice-based queries associated with speech-recognition engines, this approach to generating a structured lattice-based query may be applied even when the query segment(s) do not include audio speech. For example, this approach may be applied for comparing typed input query segments by generating a query lattice as if the typed input had been spoken. In particular, a speech waveform may be generated for the typed input and a speech-recognition engine may be applied to this waveform. Alternatively, the system may generate a lattice of phoneme strings for all possible pronunciations of the terms in a query. Then, the system may determine a lattice of all possible word matches against the phoneme lattice using a phoneme-to-phoneme confusion matrix to assess the degree of match between a phoneme in the phoneme lattice and a pronunciation of a term in the query.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for processing a query, comprising:
   in a computer system,
   receiving a first query segment, wherein the first query segment includes audio speech;
   generating a representation for the first query segment, wherein the representation includes at least two paths associated with alternative phrase sequences for an ambiguity in the audio speech, wherein at least the two alternative phrase sequences have corresponding weights that indicate a confidence that a respective phrase sequence matches a portion of the first query segment, and wherein generating the representation comprises adding to the representation a path for an alternative phrase sequence that includes a synonym for a term in the first query segment;

receiving a separate second query segment and dynamically adjusting the weights in the representation based on at least a portion of the second query segment, wherein dynamically adjusting the weights comprises:

recomputing the weights for each alternative phrase sequence based on at least one additional path associated with a composite alternative phrase sequence formed by a combination of the first and second query segments; and setting the weights in the representation equal to the recomputed weights;

comparing the paths in the representation to a group of documents, and determining matching scores for the group of documents based on the path comparisons.

2. The method of claim 1, further comprising generating and presenting a ranking of the group of documents, wherein the ranking is based on the matching scores for the group of documents.

3. The method of claim 1, wherein the first query segment further includes text.

4. The method of claim 1, wherein the ambiguity is associated with acoustic or phonetic properties of audio speech.

5. The method of claim 1, wherein the weights depend on a pattern of phrases in the first query segment.

6. The method of claim 1, wherein the weights depend on a sound quality of the first query segment.

7. The method of claim 1, wherein the weights are normalized.

8. The method of claim 1, wherein the representation is structured as a trellis.

9. The method of claim 1, wherein the representation corresponds to an intermediate state of a Viterbi decoder.

10. The method of claim 1, wherein the group of documents includes audio speech or text.

11. The method of claim 1, further comprising presenting matching portions and their corresponding contexts for the group of documents.

12. The method of claim 1, wherein a matching score for a given document is based on how many times a given path in the representation occurs in at least a portion of the given document.

13. The method of claim 1, wherein a matching score for a given document is based on a pre-determined number of best matches between the paths in the representation and the given document.

14. The method of claim 1, wherein a matching score for a given document includes different weights for different occurrences of the paths in the representation in at least a portion of the given document.

15. The method of claim 1, wherein a matching score for a given document includes a penalty for skipped words in a given path, a penalty for changes in a word order in the given path, or a penalty for words that have a narrower semantical meaning than those in the given path.

16. The method of claim 1, further comprising presenting the representation to a user prior to comparing the paths in the representation, wherein the user selects a correct path in the representation before the paths in the representation are compared to the group of documents.

17. The method of claim 1, wherein, if a given path in the representation has two or more matches in at least a portion of a given document in the group of documents, the matching score for the given document is a weighted summation of the two or more matches.

18. The method of claim 1, wherein, for a document in the group of documents that includes a lattice index, comparing the paths comprises combining a weight for an edge in the representation with a weight for a term hypothesis in the lattice index for the document, wherein combining the weight comprises using a minimum weight.

19. A non-transitory computer program product for use in conjunction with a computer system, the computer program product comprising a computer-readable storage medium and a computer-program mechanism embedded therein for configuring the computer system, the computer program mechanism including:

instructions for receiving a first query segment, wherein the first query segment includes audio speech;

instructions for generating a representation for the first query segment, wherein the representation includes at least two paths associated with alternative phrase sequences for an ambiguity in the audio speech, and wherein generating the representation comprises adding to the representation a path for an alternative phrase sequence that includes a synonym for a term in the first query segment;

instructions for receiving a separate second query segment and dynamically adjusting the weights in the representation based on at least a portion of the second query segment, wherein dynamically adjusting the weights comprises:

recomputing the weights for each alternative phrase sequence based on at least one additional path associated with a composite alternative phrase sequence formed by a combination of the first and second query segments; and setting the weights in the representation equal to the recomputed weights;

instructions for comparing the paths in the representation to a group of documents, and instructions for determining matching scores for the group of documents based on the path comparisons.

20. The computer-program mechanism of claim 19, wherein, for a document in the group of documents that includes a lattice index, comparing the paths comprises combining a weight for an edge in the representation with a weight for a term hypothesis in the lattice index for the document, wherein combining the weight comprises using a minimum weight.

21. A computer system, comprising:

a processor;

memory;

a program module, wherein the program module is stored in the memory and configurable to be executed by the processor, the program module including:

instructions for receiving a first query segment, wherein the first query segment includes audio speech;

instructions for generating a representation for the first query segment, wherein the representation includes at least two paths associated with alternative phrase sequences for an ambiguity in the audio speech and wherein generating the representation comprises adding to the representation a path for an alternative phrase sequence that includes a synonym for a term in the first query segment;

instructions for receiving a separate second query segment and dynamically adjusting the weights in the representation based on at least a portion of the second query segment, wherein dynamically adjusting the weights comprises:

recomputing the weights for each alternative phrase sequence based on at least one additional path associated with a composite alternative phrase sequence formed by a combination of the first and second query segments; and setting the weights in the representation equal to the recomputed weights;

instructions for comparing the paths in the representation to a group of documents, and instructions for determining matching scores for the group of documents based on the path comparisons.

22. The computer system of claim 21, wherein, for a document in the group of documents that includes a lattice index, comparing the paths comprises combining a weight for an edge in the representation with a weight for a term hypothesis in the lattice index for the document, wherein combining the weight comprises using a minimum weight.

* * * * *